Dec. 8, 1936.  B. C. PLACE  2,063,827
FASTENER
Filed Nov. 17, 1930
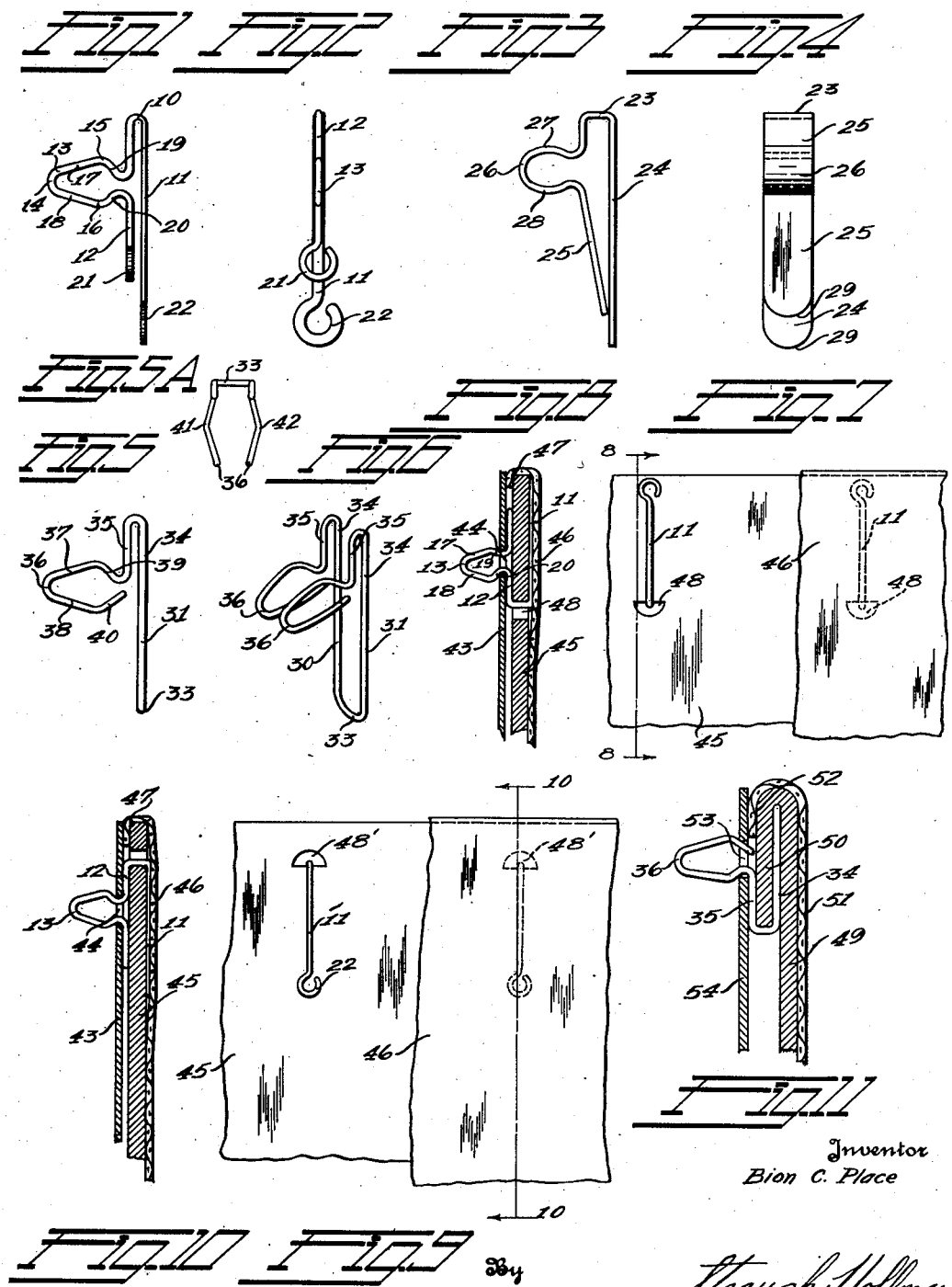
Inventor
Bion C. Place Patented Dec. 8, 1936

2,063,827

UNITED STATES PATENT OFFICE 2,063,827

FASTENER

Bion C. Place, Detroit, Mich., assignor of one-half to George E. Gagnier, Detroit, Mich.

Application November 17, 1930, Serial No. 496,252

6 Claims. (Cl. 24—213)

This invention relates to snap fasteners of the one-piece metallic type. More particularly, the invention relates to a snap fastened of the kind that may readily be detachably assembled with respect to material, that is to be secured in place thereby, and which includes an expansible and contractible shank intended to be entered into a socket, in the form of a simple perforation in a metallic or similar supporting structure to yieldingly maintain the material in position.

This invention aims to provide a spring fastener, formed by bending a single piece of material on lines that extend transversely to the length of the material, so that a fastener of very simple form is produced, which fastener is not liable to become entangled with other fasteners of the same kind, when the fasteners are handled in quantities in bulk.

This invention also aims to provide a spring fastener constructed of a single piece of metal or wire of uniform, or substantially uniform width, so that the fastener may be made without waste of the material from which it is manufactured.

A still further object of the invention is to provide a one-piece metallic spring fastener having portions of the material, from which the fastener is formed, disposed so as to provide jaws, between which the material to be secured by the fastener may be gripped, and in which the jaws are formed so as to permit the ready assembly of the fasteners with respect to the material without the necessity for forming large, or specially shaped, openings to permit such convenient assembly.

A still further object of the invention is to provide a fastener, of the kind that is constructed of a single piece of material so as to provide jaws between which the material to be secured by the fastener is gripped, in which the expansible and contractible shank of the fastener is formed by simply providing a corrugation or loop in the portion of the metal that forms one of the jaws.

Another object of the invention is to provide a one-piece metallic snap fastener, bent from a single piece of material of substantially uniform width in such way as to provide relatively long jaws extending approximately in parallelism a substantial distance to each side of the shank of the fastener, so that the fastener may be assembled through an opening in the material spaced a relatively great distance from the edge of the panel secured by the fastener though the jaws may bear against the panel close to the edge thereof irrespective of the distance of the opening therein from said edge.

Still another object of the invention is to provide a spring fastener of the type that includes a pair of jaws to grip the material, and in which the jaws are devoid of sharp points or projections, and are arranged so as to permit the fastener to be assembled through relatively small openings and so as to distribute their yielding grip on the material over a relatively large area thereof so that the material will not be cut or defaced in assembling the fastener with respect thereto, or in use.

This invention also aims to provide a one-piece metallic fastener constructed so as to provide jaws to grip the material to which the fastener is applied, in which the ends of the material from which the fastener is constructed provide the jaws of the fastener and in which said ends are so formed as to be rounded, so as not to mar or cut the material when the fastener is applied to a covered panel.

A still further object of the invention is to provide a one-piece metallic spring fastener that is of extremely simple form, and that may be manufactured at a very low cost without waste of any material.

Still further objects of the invention will appear as a description thereof proceeds with reference to the accompanying drawing, in which:—

Figure 1 is a side view of a fastener constructed in accordance with this invention formed from a single piece of wire.

Figure 2 is a view looking along the shank of the fastener shown in Figure 1.

Figure 3 is a side view of a fastener constructed in accordance with this invention, from a strip or band of sheet metal of uniform width from end to end.

Figure 4 is a view looking along the shank of the fastener, illustrated in Figure 3.

Figure 5 is a side view of a fastener formed in accordance with this invention from a doubled piece of wire.

Figure 5a is a view of the fastener of Figure 5 looking along the length of the wire.

Figure 6 is a perspective view of the fastener shown in Figure 5.

Figure 7 is a fragmentary front view of an automobile or similar trim panel, secured in position by the fastener illustrated in Figures 1 and 2, the fabric finish material being omitted to the left of this figure to show the fastener.

Figure 8 is a sectional view taken on the line 8—8 of Figure 7.

Figure 9 is a view similar to Figure 7 showing another mode of applying the fastener of this invention.

Figure 10 is a sectional view taken on the plane indicated by the line 10—10 on Figure 9.

Figure 11 is a fragmentary sectional view of a further way of using the fastener of this invention.

Like reference characters indicate like parts throughout the several figures.

The fastener of the present invention is formed from a single piece of metallic spring material tempered after the fastener is formed. It may be formed of a single piece of wire, as illustrated in Figs. 1 and 2. When formed from wire, the wire is return-bent, as indicated at 10, providing jaws 11 and 12, spaced apart preferably a little less than the thickness of the material, to which the fastener is to be applied, in the manner hereinafter described, so that said material will be firmly frictionally gripped between the jaws 11 and 12. The portion of the material from which the shorter jaw 12 is formed, is bent, approximately at the mid-portion thereof, to form a corrugation or loop 13 extending away from the jaw 12. The loop 13 constitutes the shank of the fastener, that is, it is intended to enter a suitable perforation or socket, to hold the fastener in assembled relation with respect thereto when in use. To this end the loop 13 is bowed outwardly between the nose 14 thereof, and the jaw 12 as shown at 15 and 16, providing convergently disposed guiding portions 17 and 18, and divergently disposed holding portions 19 and 20.

Preferably, as above stated, the loop 13 is formed approximately mid-way between the return-bend 10 and the end of the jaw 12, so that portions of the jaw 12 are arranged at both sides of the loop 13 constituting the shank of the fastener. Said loop may, however, be formed at any other point along the length of the jaw 12, or, if desired, the material may be return-bent at such points that the loop may be formed in the longer jaw 11, the jaws 11 and 12 being preferably constructed of substantially different lengths for a purpose hereinafter described.

The fastener of this invention may be constructed of ordinary round wire, or of wire of any other cross-section. When round wire is used, it is desirable, in order that the jaws may bear upon the material, to which the fastener is applied, in such manner as not to be liable to rock laterally, that the ends of both of the jaws 11 and 12 be preferably bent into the form of substantially closed loops 21 and 22. Any other mode of bending these portions of the wire constituting the jaws, with the same purpose in view may be utilized, and comes within the purview of the present invention. If desired, and in order to limit the amount of protrusion of the upper jaw of the fastener above the outer surface of the foundation to which the fastener may be applied, the wire constituting said jaw 11 may be flattened as illustrated in the drawing.

The fastener of the present invention may also be constructed of a relatively narrow band of thin sheet metal of uniform width from end to end. Such an arrangement is illustrated in Figure 4 of the drawing, showing a band of relatively narrow width return-bent at 23 to provide jaws 24 and 25 to grip the material to which the fastener is to be applied. The jaw 25 is provided with a corrugation or loop 26, the sides of which are bowed outwardly as shown at 27 and 28, providing an expansible and contractible shank of the fastener. Preferably the jaw 25 is bent as illustrated in Figure 3 of the drawing so that it normally converges toward the jaw 24, in the portion thereof that is disposed between the corrugation or loop 26 and the end of said jaw, so that when the fastener is put to use, the material is gripped quite firmly between the jaws 24 and 25 under a continuous tension applied by the portion of the jaw 25, that is inclined toward the jaw 24. Preferably, the ends of the jaws 24 and 25 are rounded as shown at 29 so as to avoid sharp points that might mar the material during the application of the fastener thereto or when in use.

The loop or corrugation 26 is shaped so as to provide converging guiding portions, adjacent the nose 26 thereof, and divergently disposed holding portions adjacent the jaw 25 for the purpose of the corresponding portion of the fastener shown in Figures 1 and 2. The loop or corrugation 26 may be rounded, as shown in Figure 3, or it may be formed with the sharper bends that characterize the wire type of fastener illustrated in Figures 1 and 2.

If desired, the fastener of the present invention may also assume the form illustrated in Figures 5 and 6 of the drawing, in which a fastener is shown constructed of a single piece of round wire, that is bent at its mid-portion to provide arms 30 and 31 spaced apart to give the fastener lateral stability, when applied to the material to be secured thereby. Preferably, the U-bend 33 that separates the arms 30 and 31 constitutes a resilient connection between said arms permitting them to be yieldingly separated or brought closer together, giving the fastener of this form the quality of being laterally expansible and contractible.

The wire thus doubled is bent so that each arm 30 and 31 provides a pair of jaws 34 and 35 arranged to firmly grip material disposed therebetween. Each of the jaws 35 is, preferably, but not necessarily, bent adjacent the end thereof so as to form a corrugation or a loop 36. Each loop 36 is shaped so as to provide convergently disposed guiding portions 37 and 38, and divergently disposed holding portions 39 and 40. The portion of the loop 36 forming the holding portion 40 may terminate, as shown in Figures 5 and 6, or it may, if desired, be bent in to substantial parallelism with the arms 30 and 31 respectively, as may most satisfactorily meet existing conditions. The loops 36 may be additionally bowed outwardly as indicated at 41 and 42 in Figures 5a so that the shank of this form of the fastener, composed of the two loops 36, may be contracted in two directions at right angles to each other when said shank is inserted in a socket or opening designed to receive it, thus providing four points of contact between the shank of the fastener and the portion of the supporting structure adjacent the socket or opening receiving said shank.

The fastener just described may be advantageously used to secure trim panels to automobile, aeroplane or similar bodies. It may be applied to this use in a number of ways.

A preferred way of using the fastener of this invention is illustrated in Figures 7 and 8 of the drawing in which 43 designates a fragment of a suitable supporting structure, such as a metallic plate provided with a preferably circular perforation 44 forming a socket to receive the shank of the spring fastener above described. Trim panels of the character just referred to, generally include a stiff fibrous body or foundation 45 and a suitable fabric covering 46 applied to the outer face of the foundation 45, the edges 47 of the fabric covering being wrapped around the edges of the foundation 45 as illustrated in Figure 8 of the drawing.

It is desirable to be able to apply the fastener to the trim panel such as just referred to, after the covering material 46 has been applied to one face thereof. In order that this may be done, the foundation may be provided with relatively small openings 48 of any suitable form at intervals parallel to the edges of the foundation.

The fastener of Figures 1 and 2 is assembled with respect to a panel, such as just described, by entering the longer jaw 11 through the opening 48, tilting the fastener slightly so that this can be done, and moving said fastener toward the edge of the foundation, until the foundation is firmly gripped between said jaws 11 and 12. Inasmuch as the jaw 11 is substantially longer than the jaw 12, it will be readily understood that said jaw may be readily entered into the opening 48 and that the assembly of the fastener with respect to the foundation may be readily brought about. As many fasteners as are needed to secure the trim panel in position are assembled with the manner just described with respect to the body or foundation of the panel. Such fasteners are assembled so that when the panel is brought in position for application to the supporting structure, a fastener will be approximately opposite each opening 44 in said structure. The fasteners may be shifted in any direction slightly to bring about exact registry. The panel is then applied to the supporting structure causing the loops 13, constituting the shanks of the fasteners, to enter the openings. Each opening is formed smaller in diameter than the major transverse dimension of the loop. As pressure is applied against the panel causing the loop 13 to enter said perforation, the converging guiding portions engage the edges of the perforation or opening 44, causing a contraction of the shank of the fastener, whereby said loop may completely enter said perforation. As the fastener enters said perforation and the portions thereof that are widest have passed therethrough, the resilience of the fastener causes the diverging holding portions to spring apart to yieldingly engage the corners of the perforations in the supporting structure, immediately adjacent thereto. The snapping of the loops 13 in position in the perforations in the supporting structure, accordingly, causes the panel to be yieldingly held against the supporting structure by a wedging action, exerted by said divergently disposed holding portions.

The jaw 11 may extend substantially to the edge of the foundation exerting a pressure against said edge of the foundation, although the opening 48 through which the fastener passes through the foundation is located relatively far from said edge. The panel is thus not weakened materially by the formation of said opening, and the fastener exerts a holding effect immediately adjacent said edge, causing the panel to lie flat against the supporting structure at the edges.

If desired, the fastener may be applied in the manner illustrated in Figures 9 and 10, in which the relatively small openings 48' are formed relatively close to the edge of the panel and the fastener is applied by causing the jaws thereof to engage the foundation or body beneath rather than above said opening. The panel is applied to the supporting structure in precisely the same manner as above described, with reference to Figures 7 and 8.

While Figures 7, 8, 9 and 10 illustrate the application of the fastener as shown in Figures 1 and 2 of the drawing, it will be readily understood that the modified form of the fastener as illustrated in Figures 3, 4, 5 and 6 may be applied in precisely the same way. It will be readily understood that the fastener of the figures just referred to, when engaged in circular perforations in the supporting structure, contact therewith at four points rather than at two points, as in the form of the invention illustrated in Figures 1 and 2. It will be observed further, however, that the fastener illustrated in Figures 5, 5a, and 6 can expand within the perforation in the supporting structure in a plurality of directions extending approximately at right angles to each other, so that the fastener is held firmly in the opening in the supporting structure.

The fastener of this invention may also be applied as illustrated in Figure 11 of the drawing, in which a foundation for a trim panel 49 is bent backwardly along its edges, as shown at 50. Said foundation is covered by means of suitable fabric 51 that is lapped around the turned back edge 50 of the foundation, as shown at 52. A panel having the edges of the foundation bent back in the manner just described may have the fasteners attached to said turn back edges, causing said edges to enter between the jaws thereof. The fastener of the type illustrated in Figures 5, 5a and 6 is shown applied to an edge of the panel 49, the turned back edge 50 being entered between the jaws 34 and 35. The loops 36 of said fastener enter a perforation 53 in a suitable supporting structure 54. Inasmuch as the fabric covering for the panel extends relatively close to the perforation 53 in the supporting structure 54, it is desirable to use a fastener of the type just referred to that does not have the inner jaw extending beyond the loop constituting the shank of the fastener. It will be understood, however, that when the perforation 53 is disposed further from the edge of the supporting structure, that fasteners such as illustrated in Figures 1 to 4 may be used in precisely the same way.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:—

1. A one-piece metal fastener complete in itself for attaching trim panels or the like to a perforated supporting structure formed of a strip of spring material having a width materially less than the diameter of the perforations in said supporting structure, comprising a pair of spaced jaws normally presenting converging portions which serve to firmly frictionally grip the panel to which the fastener is applied when said portions are separated by the entry of a part of the panel therebetween, one of said jaws being provided with a resilient compressible shank formed from the material of the fastener, said shank being shaped to provide means to prevent the ready withdrawal of said shank from a perforation in a supporting structure in which it is snapped.

2. A one-piece metallic spring fastener consisting of jaws spaced apart so as to grip material between them, one of said jaws being substantially shorter than the other to facilitate application of the fastener to said material and highly resilient contractible and expansible loops depending from one of said jaws, said loops being shaped to engage at four substantially spaced points at the sides of a socket in which they are snapped.

3. A spring stud fastener complete in itself and formed from a strip of spring material of sufficiently narrow width to permit a part of the metal to enter a perforation in a supporting structure, comprising a pair of spaced flat jaws formed for sliding on the material to be secured by the fastener and normally separated less than the thickness of said material, and an elongated loop extending from and integrally connected to one of said jaws, the sides of said loop diverging at the end of the loop remote from said last-named jaw and said sides converging adjacent said jaw.

4. A spring stud fastener complete in itself and formed from a strip of spring metal of sufficiently narrow width to permit a part of the metal to enter a perforation in a supporting structure, comprising a pair of spaced flat jaws formed for sliding on the material to be secured by the fastener and normally separated less than the thickness of said material, and an elongated loop extending from the mid-portion of one of said jaws and integrally connected thereto, said loop being bent to provide a relatively sharp rounded nose to facilitate entry in said perforation and to provide means to engage the inside of the supporting structure when said loop is snapped therein.

5. The combination defined in claim 3, in which said spring material is wire having the portions thereof constituting the jaws bent at right angles to the plane of said jaws so as to provide contact with the material over an area substantially exceeding the diameter of the wire from which said loop is formed.

6. The combination defined in claim 3, in which said material consists of doubled wire forming the jaws, each wire branch carrying a loop as defined in said claim.

BION C. PLACE.